(12) United States Patent
Choi

(10) Patent No.: US 8,813,084 B2
(45) Date of Patent: Aug. 19, 2014

(54) BROADCAST RECEIVING APPARATUS AND SCHEDULING METHOD THEREOF

(75) Inventor: Young-Ho Choi, Gunpo-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 494 days.

(21) Appl. No.: 13/102,330

(22) Filed: May 6, 2011

(65) Prior Publication Data

US 2011/0314476 A1    Dec. 22, 2011

(30) Foreign Application Priority Data

Jun. 22, 2010    (KR) ................ 10-2010-0059034

(51) Int. Cl.
*G06F 9/46*    (2006.01)
(52) U.S. Cl.
USPC ........................................ 718/103; 718/102
(58) Field of Classification Search
None
See application file for complete search history.

(56) References Cited

U.S. PATENT DOCUMENTS 7,055,165 B2 *   5/2006   Connelly ............... 725/9
2010/0017806 A1 *   1/2010   Maslov ............... 718/103

OTHER PUBLICATIONS

Communication dated Oct. 28, 2011 from the European Patent Office in counterpart European application No. 11170399.7.
Govindan et al., "Xen and Co.: Communication-aware CPU Scheduling for Consolidated Xen-based Hosting Platforms," VEE '07 Proceedings of the 3rd International Conference on Virtual execution Environments, Jun. 13, 2007-Jun. 15, 2007, San Diego, CA.
Ongaro et al., "Scheduling I/O in Virtual Machine Monitors," VEE '08 Proceedings of the 4th International Conference on Virtual Execution Environments, Jul. 5, 2008-Jul. 7, 2008, Seattle, WA.
Wikipedia, "Scheduling (computing)," Jun. 21, 2010, http://en.wikipedia.org/w/index.php?title=Scheduling_%28computing%29&oldid=369332555.

* cited by examiner

*Primary Examiner* — Kenneth Tang
(74) *Attorney, Agent, or Firm* — Sughrue Mion, PLLC

(57) ABSTRACT

A broadcast receiving apparatus and scheduling method thereof are provided. The broadcast receiving apparatus includes: a communication interface which performs an input-output operation of the broadcast receiving apparatus in response to a request for an input-output event from at least one of the plurality of operating systems; and a controller which processes the requested input-output event according to a priority given to the operating system that has requested the input-output event.

14 Claims, 6 Drawing Sheets

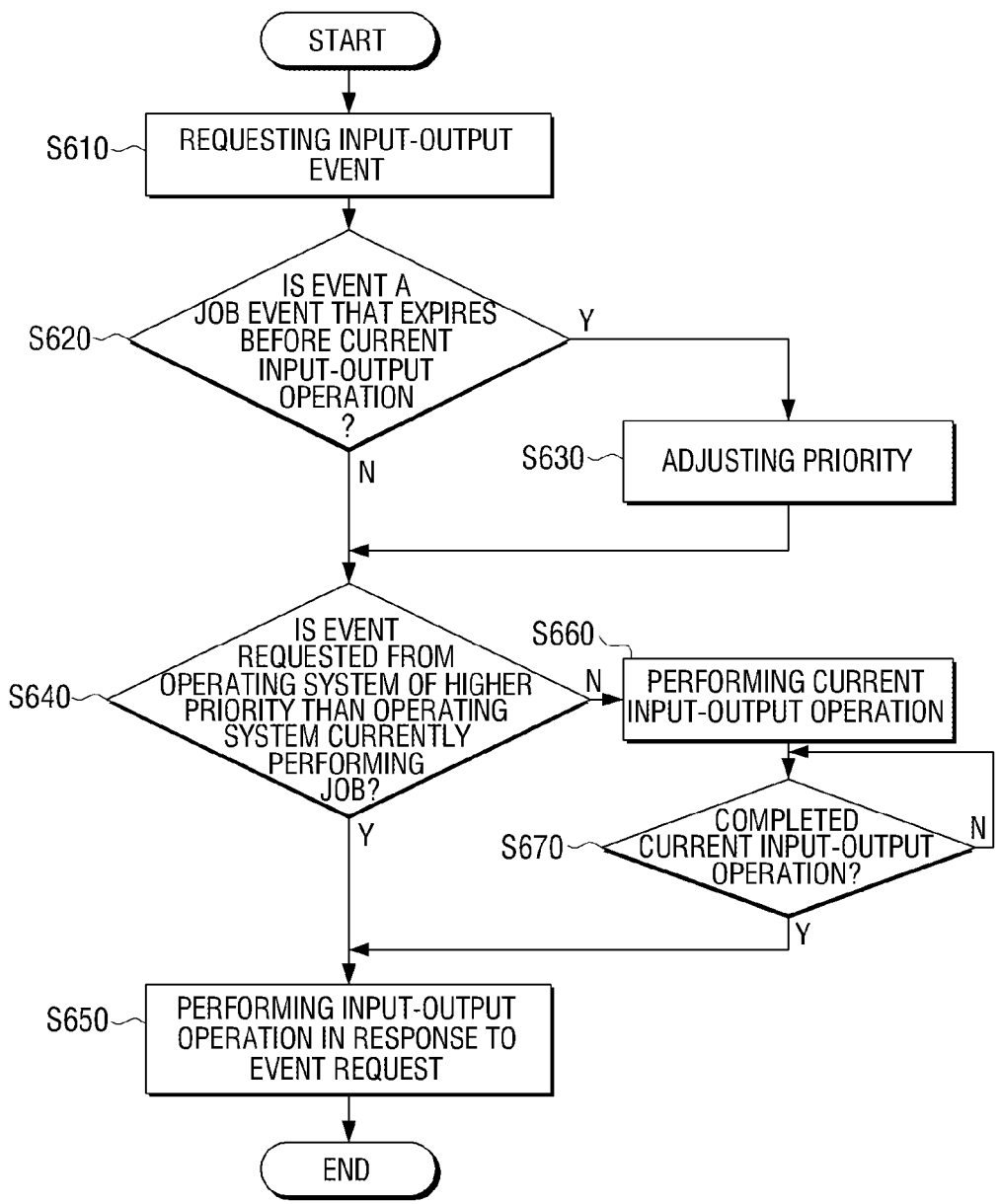

US 8,813,084 B2

BROADCAST RECEIVING APPARATUS AND SCHEDULING METHOD THEREOF

CROSS-REFERENCE TO RELATED APPLICATION

This application claims priority from Korean Patent Application No. 10-2010-0059034, filed on Jun. 22, 2010, in the Korean Intellectual Property Office, the disclosure of which is incorporated herein by reference in its entirety.

BACKGROUND

1. Field

Methods and apparatuses consistent with the exemplary embodiments relate to a broadcast receiving apparatus and a scheduling method thereof, and more particularly, to a broadcast receiving apparatus which can enhance a replaying performance thereof and a scheduling method thereof.

2. Description of the Related Art

A broadcast receiving apparatus, which is an apparatus for receiving a digital broadcast, converts a digital broadcast signal or an analog broadcast signal transmitted from a broadcasting station, and video and audio signals input from various external apparatuses such as a video player, a digital versatile disk (DVD) player, and a Blue-ray disk player, into a transport stream (TS) signal, and displays the TS signal or transmits the TS signal to an external display apparatus. A representative example of such a broadcast receiving apparatus includes a digital television, an internet protocol television (IPTV) using video on demand (VOD), and a set-top box.

As broadcast receiving apparatuses have been rapidly developing, these apparatuses have reached a performance level that is equivalent to that of a personal computer (PC). Thus, broadcast receiving apparatuses are able to provide numerous services, like PCs currently provide.

However, broadcast receiving apparatuses should utilize insufficient resources as efficiently as possible in contrast with the PC, and should protect its unique function from other services. Considering this aspect of the broadcast receiving apparatus, applying services from a PC may result in a serious problem that affects security and stability.

In order to solve this problem, a broadcast receiving apparatus may classify services into a basic service, such as a service provided by a digital TV, and an additional service, such as a service provided by a PC, and provides the classified services using different operating systems.

However, in a related-art input-output scheduling method, a main operating system processes an input-output of a sub-operating system on behalf of the sub-operating system. Therefore, if the input-output of the sub-operating system occurs frequently, the main operating system should refrain from performing its own input-output operation in order to process the input-output of the sub-operating system on behalf of the sub-operating system.

SUMMARY

An aspect of an exemplary embodiment provides a broadcast receiving apparatus which can enhance a replaying performance thereof and a scheduling method thereof.

According to an aspect of an exemplary embodiment, a scheduling method of a broadcast receiving apparatus which uses a plurality of operating systems, includes: receiving a request for an input-output event from at least one of the plurality of operating systems, and processing the input-output event according to a priority given to the operating system that has requested the input-output event.

The processing the input-output event may include, if the priority of the operating system that has requested the input-output event is higher than a priority of an operating system that is currently performing a current input-output operation, performing an input-output operation of the broadcast receiving apparatus in response to the request for the input-output event.

The processing the input-output event may include, if the priority of the operating system that has requested the input-output event is lower than a priority of an operating system that is currently performing a current input-output operation, retaining the current input-output operation.

The processing the input-output event may include, if the requested input-output event is an event corresponding to a job that expires before a job corresponding to a current input-output operation, upgrading the priority given to the operating system that has requested the input-output event and processing the input-output event.

Each of the plurality of operating systems may virtualize and process an input-output operation of another operating system.

The plurality of operating systems may include a first operating system and a second operating system, and the first operating system may be used to provide a basic service of the broadcast receiving apparatus and the second operating system may be used to provide an additional service of the broadcast receiving apparatus.

The first operating system may have a higher priority than a priority of the second operating system.

According to an aspect of another exemplary embodiment, a broadcast receiving apparatus which uses a plurality of operating systems, includes: a communication interface which performs an input-output operation of the broadcast receiving apparatus in response to a request for an input-output event from at least one of the plurality of operating systems, and a controller which processes the requested input-output event according to a priority given to the operating system that has requested the input-output event.

If the priority of the operating system that has requested the input-output event is higher than a priority of an operating system that is currently performing a current input-output operation, the controller may control the communication interface to perform an input-output operation of the broadcast receiving apparatus in response to the request for the input-output event.

If the priority of the operating system that has requested the input-output event is lower than a priority of an operating system that is currently performing a current input-output operation, the controller may control the communication interface to retain the current input-output operation.

If the requested input-output event is an event corresponding to a job that expires before a job corresponding to a current input-output operation, the controller may upgrade the priority given to the operating system that has requested the input-output event and process the input-output event.

Each of the plurality of operating systems may virtualize and process an input-output operation of another operating system.

The plurality of operating system may include a first operating system and a second operating system, and the first operating system may be used to provide a basic service of the broadcast receiving apparatus and the second operating system may be used to provide an additional service of the broadcast receiving apparatus.

The first operating system may have priority higher than a priority of the second operating system.

Additional aspects of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments thereof with reference to the accompanying drawings in which:

FIG. 6 is a flowchart illustrating a scheduling method of a broadcast receiving apparatus according to an exemplary embodiment.

DETAILED DESCRIPTION OF THE EXEMPLARY EMBODIMENTS

Figure 1:
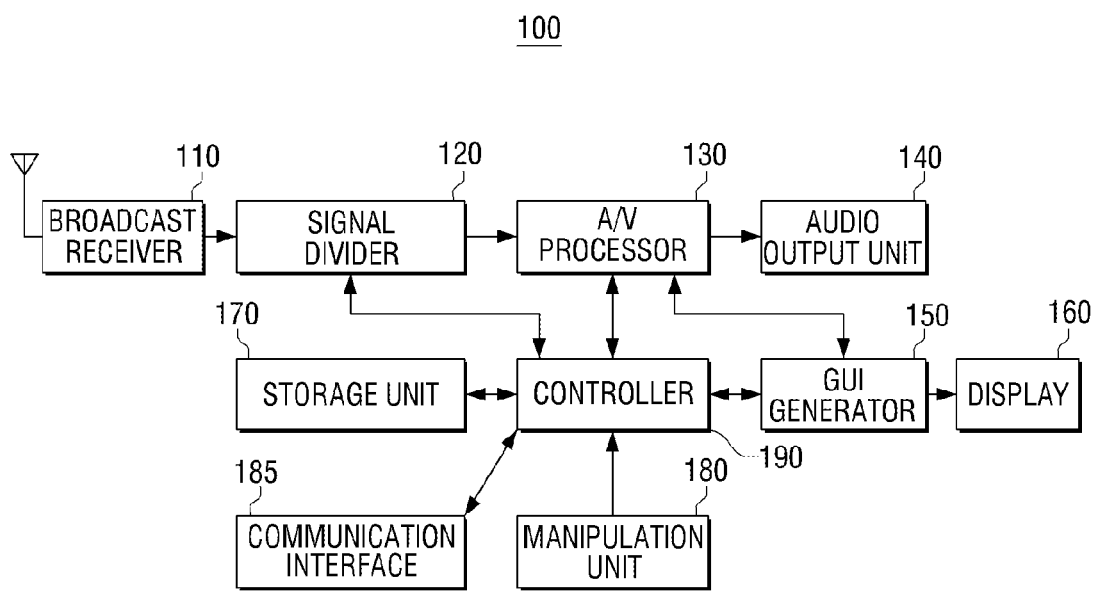
FIG. 1 is a block diagram illustrating a broadcast receiving apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the description of the exemplary embodiments with unnecessary detail.

FIG. 1 is a block diagram illustrating a broadcast receiving apparatus according to an exemplary embodiment. In this exemplary embodiment, operating systems (or imaginary machines, hereinafter referred to as "operating system") used in the broadcast receiving apparatus 100 are limited to a first operating system (or a main operating system) and a second operating system (a sub-operating system) for convenience of explanation, however the broadcast receiving apparatus of the exemplary embodiment may include more than two operating systems.

The first operating system is an operating system that is used for providing a basic service of the broadcast receiving apparatus 100, whereas the second operating system is an operating system that is used for providing an additional service. Each operating system may have a different priority and a plurality of operating systems are able to virtualize and process an input-output of another operating system. For example, the first operating system may have a higher priority than that of the second operating system and the first operating system is able to virtualize and process an input-output of the second operating system.

The basic service includes a service for reproducing a broadcast signal corresponding to a tuned channel or a video signal corresponding to a selected image, which is an original function of the broadcast receiving apparatus 100, or refers to a service that is initially installed in the broadcast receiving apparatus 100 by the manufacturer of the broadcast receiving apparatus 100. The additional service includes a service that is provided by the broadcast receiving apparatus 100 in addition to the above basic service, such as accessing the Internet or playing a game, or a service that is provided by being installed in the broadcast receiving apparatus 100 by the user.

Referring to FIG. 1, the broadcast receiving apparatus 100 according to an exemplary embodiment includes a broadcast receiver 110, a signal divider 120, an audio/video (A/V) processor 130, an audio output unit 140, a graphic user interface (GUI) generator 150, a display 160, a storage unit 170, a manipulation unit 180, a communication interface 185, and a controller 190.

The broadcast receiver 110 receives a broadcast from a broadcasting station or a satellite over a wired or wireless medium and tunes to the broadcast.

The signal divider 120 divides a broadcast signal into a video signal, an audio signal, and an additional information signal. The signal divider 120 transmits the video signal and the audio signal to the A/V processor 130.

The A/V processor 130 performs signal-processing such as video decoding, video scaling, and audio decoding with respect to the video signal and the audio signal input from the broadcast receiver 110 and the storage unit 170. The A/V processor 130 outputs the video signal to the GUI generator 150 and outputs the audio signal to the audio output unit 140.

On the other hand, if the storage unit 170 stores the received audio and video signals, the A/V processor 130 may output video and audio in a compressed format to the storage unit 170.

The audio output unit 140 converts the audio signal output from the A/V processor 130 into sound and outputs the sound through a speaker (not shown) or outputs it to an external apparatus through an external output terminal (not shown).

The GUI generator 150 generates a GUI to be provided to the user. The GUI generator 150 adds the generated GUI to the image output from the A/V processor 130. The display 160 displays the GUI-added image.

The storage unit 170 may store image contents. More specifically, the storage unit 170 may receive image contents in which audio and video are compressed from the A/V processor 130 and store the image contents, and may output the stored image contents to the A/V processor 130 under the control of the controller 190. The storage unit 170 may be realized as a hard disk, a non-volatile memory, or a volatile memory.

The manipulation unit 180 may be realized as a touch screen, a touch pad, a key button, or a key pad to allow for a user's manipulation of the broadcast receiver. More specifically, the user uses the manipulation unit 180 to select whether to set the broadcast receiving apparatus 100 to provide the basic service or the additional service only or whether to set the broadcast receiving apparatus 100 to provide the basic service and the additional service at the same time. The manipulation unit 180 transmits a basic service execution command or an additional service execution command to the controller 190 corresponding to a user's selection, which will be described later.

An example of the basic service may be a service for reproducing a broadcast signal or a video signal, which is an original function of the broadcast receiving apparatus 100, and an example of the additional service may be a service for providing a $3^{rd}$ party application such as a game and a web-browser.

The communication interface 185 is designed to connect the broadcast receiving apparatus 100 to an external apparatus (not shown) and is connected to the external apparatus through a local area network (LAN) or Internet as well as a universal serial bus (USB) port.

Also, the communication interface 185 performs an input-output operation corresponding to an input-output event. More specifically, the communication interface 185 receives an input-output control command from the controller 190 and performs the input-output operation corresponding to the received input-output control command.

The controller 190 controls an overall operation of the broadcast receiving apparatus 100, and receives a request for an input-output event from at least one of a plurality of operating systems. More specifically, the controller 190 may receive a request for a direct input-output event from the first operating system and may receive a request for an indirect input-output event via the first operating system from the second operating system. In the drawings, the first operating system virtualizes and processes the input-output of the second operating system, but the second operating system may virtualize and process the input-output of the first operating system.

The controller 190 processes the input-output event in response to the request for the input-output event. More specifically, if an operating system that has requested an input-output event has a higher priority than that of an operating system that is currently performing an input-output operation, the controller 190 may control the communication interface 185 to perform an input-output operation corresponding to the requested input-output event. For example, if the operating system that has requested the input-output event is the first operating system and the operating system that is currently performing the input-output operation is the second operating system, the controller 190 may perform an input-output operation in response to the request for the input-output event of the first operating system.

On the other hand, if the operating system that has requested the input-output event has a lower priority than that of the operating system that is currently performing the input-output operation, the controller 190 may retain the current input-output operation. For example, if the operating system that has requested the input-output event is the second operating system and if the operating system that is currently performing the input-output operation is the first operating system, the controller 190 may defer performing an input-output operation requested by the second operating system.

If the requested input-output event is an event corresponding to a job that will expire before a job corresponding to a current input-output operation, the priority given to the operating system that has requested the input-output event may be upgraded.

In general, an operating system provides two types of timers. The first timer is a 'periodic timer' to perform a time-related process when executable jobs exist in the operating system, and the second timer is a single shot timer to enter an idle state for a job that is scheduled to expire first when there is no executable job in the operating system. The periodic timer is requested regardless of presence/absence of a job to be awakened by an event, whereas the single shot timer is set according to a job to be awakened.

Accordingly, when it is time to execute a timer event set by the single shot timer, a priority of an operating system that has requested the timer event is increased so that a response speed of a job to be awakened in the corresponding operating system can be improved.

In other words, if a single shot timer event is received, a priority of an operating system that has requested the corresponding timer event is temporarily increased. By processing the single shot timer event preferentially, choppy playback of a moving picture frame of a main operating system which depends on the accuracy of transmission of an event can be prevented.

Also, by controlling input-output scheduling by setting a different priority for each operating system, the execution of the second operating system is not dominated by the execution of the first operating system. In other words, choppy playback at the first operating system, which is caused by an increasingly frequent input-output request of the second operating system, can be minimized.

Figure 2:
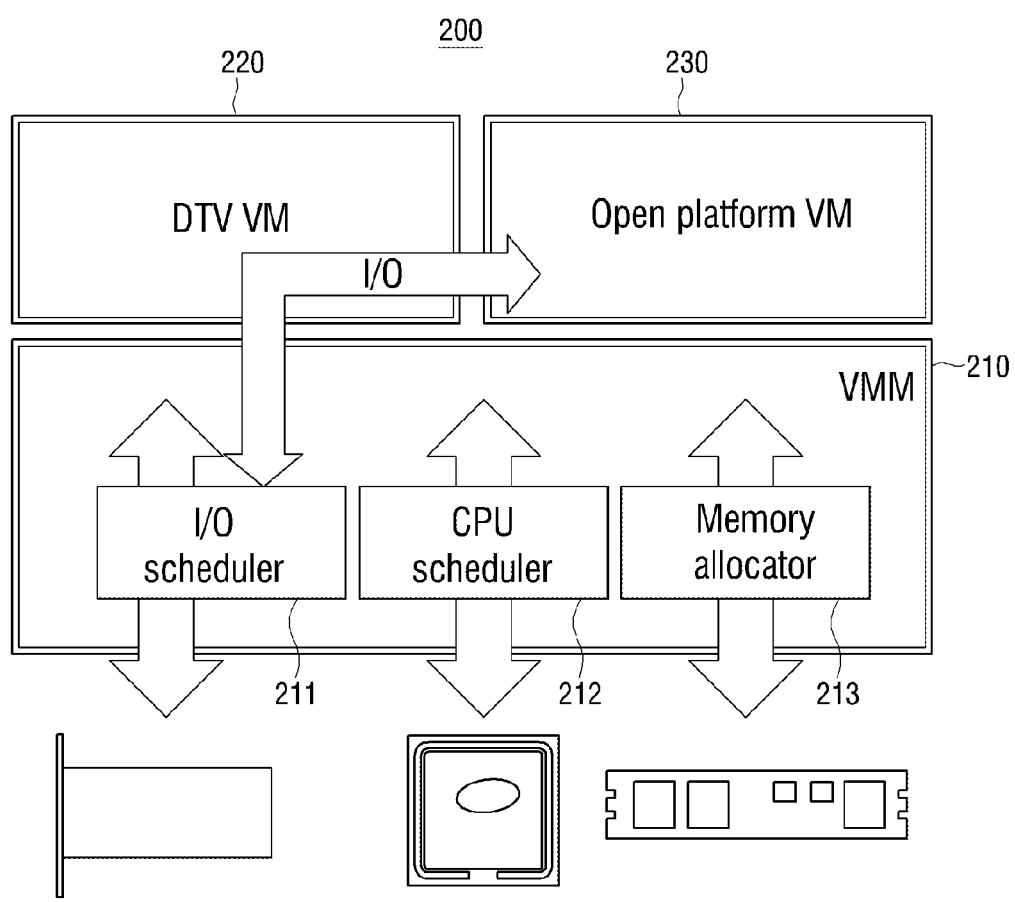
FIG. 2 is a view illustrating a detailed structure of a controller of FIG. 1.

FIG. 2 is a view illustrating a controller 200, which corresponds to the controller 190 of FIG. 1.

Referring to FIG. 2, the controller 200 includes a virtual machine monitor (VMM) 210 and a plurality of operating systems 220, 230.

The plurality of operating systems 220, 230 perform the service of the broadcast receiving apparatus 100. More specifically, the first operating system 220 is used for providing a basic service of the broadcast receiving apparatus 100, and performs a direct input-output operation with respect to the VMM 210 and transmits an input-output of the second operating system 230 to the VMM 210.

The second operating system 230 is used for providing an additional service, and performs an input-output operation with respect to the VMM 210 via the first operating system 220.

The VMM 210 performs virtualization with respect to the plurality of operating systems 220, 230 and performs an input-output operation with respect to the plurality of operating systems 220, 230. The VMM 210 may include an input-output scheduler 211, a central processing unit (CPU) scheduler 212, and a memory allocator 213.

The input-output scheduler 211 performs scheduling with respect to an input-output event in response to an input-output event request. More specifically, if an operating system that has requested an input-output event has a higher priority than that of an operating system that is currently performing an input-output operation, the input-output scheduler 211 may control the communication interface 185 to perform an input-output operation corresponding to the currently requested input-output event. On the other hand, if the operating system that has requested the input-output event has a lower priority than that of the operating system that is currently performing the input-output operation, the input-output scheduler 211 retains the current input-output operation. The term "scheduling" recited herein refers to context-switching to allow a plurality of operating systems to operate simultaneously.

If the requested input-output event is an event corresponding to a job that will expire before a job corresponding to a current input-output operation, the priority given to the operating system that has requested the input-output event is upgraded. This operation has been described in the above and a detailed explanation thereof will be omitted.

The CPU scheduler 212 schedules events of the plurality of operating systems 220, 230. More specifically, the CPU scheduler 212 is able to process an event other than the input-output event. The memory allocator 213 allocates a memory area to each of the plurality of operating systems 220, 230.

Figure 3:
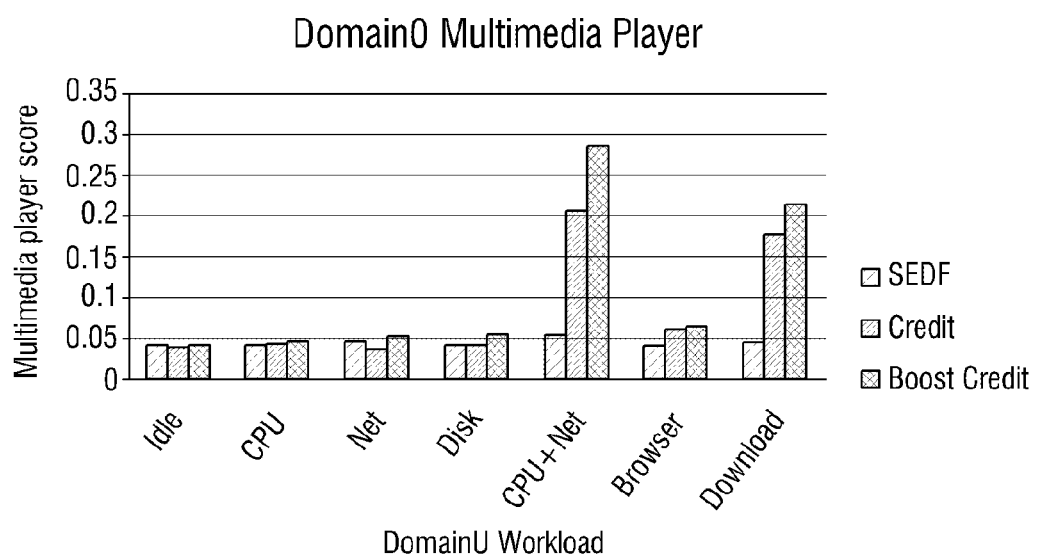
FIGS. 3 to 5 are views illustrating an operational performance of a broadcast receiving apparatus according to diverse conditions.
Figure 4:
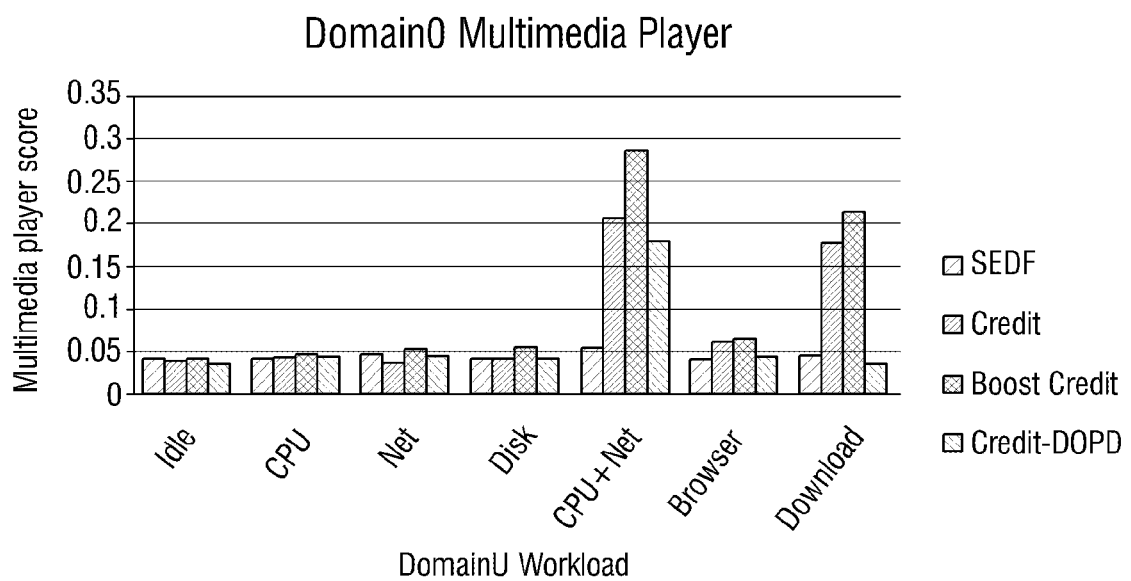
Figure 5:
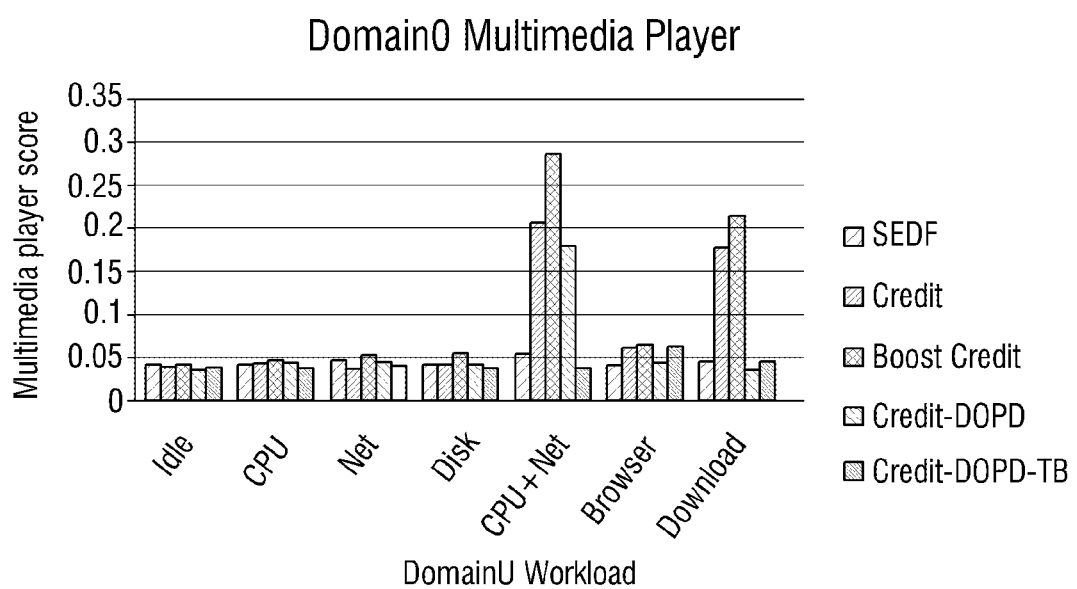

FIGS. 3 to 5 are views illustrating an operational performance of the broadcast receiving apparatus according to an exemplary embodiment under various conditions.

The term 'score' expresses a frame drop, and how much a frame is dropped at a time, as a numerical value. The score is calculated using a formula of a multimedia workload used to evaluate a performance of a scheduler.

The items set forth along the horizontal axes of the graphs of FIGS. 3 to 5 refer to operational states of the second operating system. Specifically, 'Idle' is a state in which no operation is performed, 'CPU' is a state in which a CPU is used, 'Net' is a state in which a network is used, 'Disk' is a state in which a storage medium is used, 'CPU+NET' is a state in which a CPU and a network are used together with each other, 'Browser' is a state in which internet searching is performed, and 'Download' is a state in which data is downloaded through a network.

Referring to FIG. 3, if a related-art scheduling algorithm such as Credit and Boost Credit is used, disconnection in the operation of the first operating system, that is, choppy playback at the first operating system, is frequently caused when the second operating system uses the CPU and the network simultaneously ('CPU+Net') or downloads data ('Download').

Referring to FIG. 4, if scheduling is performed by giving a different priority to each of the operating systems (Credit-DOPD), a moving picture replaying performance is improved in comparison with the related-art scheduling algorithms Credit and Boost Credit. In particular, reduction in choppy playback when data is downloaded ('Download') is noticeable.

Referring to FIG. 5, if scheduling is performed by giving a different priority to each of the operating systems and upgrading the priority using the single shot timer (Credit-DoPD-TB), the moving picture replaying performance is improved in comparison with the related-art scheduling algorithms Credit and Boost Credit. In all cases, choppy playback is prevented.

FIG. 6 is a flowchart illustrating a scheduling method according to an exemplary embodiment. The method according to the exemplary embodiment may be performed by a processor. The method may also be embodied as instructions stored on a non-transitory computer readable medium.

Referring to FIG. 6, if an input-output event is requested (S610), it is determined whether the requested input-output event is a job event that will expire before a job corresponding to a current input-output operation (S620). More specifically, the input-output event is requested from at least one of a plurality of operating systems and it is determined whether the requested input-output event is a job event that will expire before a job corresponding to a current input-output operation.

If the requested input-output event is an event corresponding to a job that will expire before a job corresponding to a current input-output operation, a priority given to the operating system that has requested the input-output event is upgraded (S630). On the other hand, if the requested input-output event is not an event corresponding to a job that will expire before a job corresponding to a current input-output operation, the next operation is performed without upgrading the priority.

The input-output event is processed according to the priority given to the operating system that has requested the input-output event. More specifically, if the priority of the operating system that has requested the input-output event is higher than that of an operating system that is currently performing an input-output operation (S640-Y), an input-output operation corresponding to the requested input-output event is performed (S650). For example, if the operating system that has requested the input-output event is the first operating system and the operating system that is currently performing the input-output operation is the second operating system, the input-output operation of the first operating system is performed preferentially.

On the other hand, if the priority of the operating system that has requested the input-output event is lower than the priority of the operating system that is currently performing the input-output operation (S640-N), the input-output operation currently performed by the operating system is retained (S660). It is then determined whether the current input-output operation is completed (S670). If the current input-output operation is completed (S670-Y), the input-output operation of the operating system that has requested the input-output event is performed (S650). For example, if the operating system that has requested the input-output event is the second operating system and the operating system that is currently performing the input-output operation is the first operating system, the input-output of the second operating system is deferred.

Accordingly, since the scheduling method according to an exemplary embodiment gives different priorities to the operating systems and the input-output operation of the operating system of the higher priority is processed preferentially, the execution of the first operating system is not dominated by the execution of the second operating system. In other words, choppy playback at the first operating system which is caused by an increasingly frequent input-output request of the second operating system can be minimized. The scheduling method of FIG. 6 may be executed in the broadcast receiving apparatus 100 illustrated in FIG. 1 and may be executed in any other type of broadcast receiving apparatus.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A scheduling method of a broadcast receiving apparatus, the scheduling method comprising:
receiving a request for an input-output event from a first operating system; and
processing the requested input-output event according to a priority of the first operating system,
wherein the processing the requested input-output event comprises, if the requested input-output event is an event corresponding to a job of a second operating system that expires before a job corresponding to a current input-output operation, upgrading the priority given to the first operating system and processing the requested input-output event, and
the first operating system is used to provide a service of the broadcast receiving apparatus and the second operating system is used to provide an additional service of the broadcast receiving apparatus.

2. The scheduling method as claimed in claim 1, wherein the processing the requested input-output event comprises, if the priority of the first operating system is higher than a priority of the second operating system that is currently performing a current input-output operation, performing an input-output operation corresponding to the requested input-output event.

3. The scheduling method as claimed in claim 1, wherein the processing the requested input-output event comprises, if the priority of the first operating system is lower than a priority of the second operating system that is currently performing a current input-output operation, retaining the current input-output operation.

4. The scheduling method as claimed in claim 1, wherein the first operating system virtualizes and processes an input-output operation of the second operating system, and the second operating system virtualizes and processes an input-output operation of the first operating system.

5. The scheduling method as claimed in claim 1, wherein the first operating system has a higher priority than a priority of the second operating system.

6. A broadcast receiving apparatus comprising:
   at least one processor;
   a communication interface which is programmed to perform an input-output operation of the broadcast receiving apparatus in response to a request for an input-output event from a first operating system; and
   a controller which is programmed to process the requested input-output event according to a priority given to the first operating system,
   wherein, if the requested input-output event is an event corresponding to a job of a second operating system that expires before a job corresponding to a current input-output event, the controller is programmed to upgrade the priority given to the first operating system and processes the requested input-output event,
   the first operating system is used to provide a service of the broadcast receiving apparatus and the second operating system is used to provide an additional service of the broadcast receiving apparatus, and
   the at least one processor configured to implement at least one of the communication interface or the controller.

7. The broadcast receiving apparatus as claimed in claim 6, wherein, if the priority of the first operating system is higher than a priority of the second operating system that is currently performing a current input-output operation, the controller is programmed to control the communication interface to perform an input-output operation corresponding to the requested input-output event.

8. The broadcast receiving apparatus as claimed in claim 6, wherein, if the priority of the first operating system is lower than a priority of the second operating system that is currently performing a current input-output operation, the controller is programmed to control the communication interface to retain the current input-output operation.

9. The broadcast receiving apparatus as claimed in claim 6, wherein the first operating system is programmed to virtualize and process an input-output operation of the second operating system, and the second operating system is programmed to virtualize and process an input-output operation of the first operating system.

10. The broadcast receiving apparatus as claimed in claim 6, wherein the first operating system has a priority higher than a priority of the second operating system.

11. A non-transitory computer readable medium storing instructions, which when executed by a computer, performs a method comprising:
    receiving a request for an input-output event from a first operating system; and
    processing the requested input-output event according to a priority of the first operating system,
    wherein the processing the requested input-output event comprises, if the requested input-output event is an event corresponding to a job of a second operating system that expires before a job corresponding to a current input-output operation, upgrading the priority given to the first operating system and processing the requested input-output event,
    the first operating system is used to provide a service of the broadcast receiving apparatus and the second operating system is used to provide an additional service of the broadcast receiving apparatus.

12. The non-transitory computer readable medium of claim 11, wherein the processing the requested input-output event comprises, if the priority of the first operating system is higher than a priority of the second operating system that is currently performing a current input-output operation, performing an input-output operation corresponding to the requested input-output event.

13. The non-transitory computer readable medium of claim 11, wherein the processing the requested input-output event comprises, if the priority of the first operating system is lower than a priority of the second operating system that is currently performing a current input-output operation, retaining the current input-output operation.

14. The non-transitory computer readable medium of claim 11, wherein the first operating system has a higher priority than a priority of the second operating system.

\* \* \* \* \*